United States Patent
Morie et al.

(10) Patent No.: US 10,831,447 B2
(45) Date of Patent: Nov. 10, 2020

(54) MULTIPLY-ACCUMULATE OPERATION DEVICE

(71) Applicant: Sony Corporation, Tokyo (JP)

(72) Inventors: Takashi Morie, Fukuoka (JP); Quan Wang, Fukuoka (JP); Hakaru Tamukoh, Fukuoka (JP)

(73) Assignee: Sony Corporation, Tokyo (JP)

( * ) Notice: Subject to any disclaimer, the term of this patent is extended or adjusted under 35 U.S.C. 154(b) by 106 days.

(21) Appl. No.: 16/325,003

(22) PCT Filed: Aug. 3, 2017

(86) PCT No.: PCT/JP2017/028247
§ 371 (c)(1),
(2) Date: Feb. 12, 2019

(87) PCT Pub. No.: WO2018/034163
PCT Pub. Date: Feb. 22, 2018

(65) Prior Publication Data
US 2019/0171418 A1 Jun. 6, 2019

(30) Foreign Application Priority Data
Aug. 19, 2016 (JP) ................................ 2016-161182

(51) Int. Cl.
*G06F 7/544* (2006.01)
*G06N 3/063* (2006.01)
*G06N 3/04* (2006.01)

(52) U.S. Cl.
CPC ........... *G06F 7/5443* (2013.01); *G06N 3/049* (2013.01); *G06N 3/0481* (2013.01); *G06N 3/0635* (2013.01)

(58) Field of Classification Search
CPC .................................................. G06F 7/5443
See application file for complete search history.

(56) References Cited

U.S. PATENT DOCUMENTS

2015/0339570 A1* 11/2015 Scheffler .................. G06N 3/04
706/16
2018/0357527 A1* 12/2018 Benosman ........... G06N 3/0481

FOREIGN PATENT DOCUMENTS

JP 2004110421 A 4/2004
JP 2016099707 A 5/2016

OTHER PUBLICATIONS

T. Morie et al., "An Analog-Digital Merged Neural Circuit Using Pulse Width Modulation Technique", IEICE Trans. Fundamentals, vol. E82-A, No. 2., Feb. 1999.

(Continued)

*Primary Examiner* — Chuong D Ngo
(74) *Attorney, Agent, or Firm* — Michael Best & Friedrich LLP

(57) ABSTRACT

Electric charges depending on values of $N^+$ electric signals and values of corresponding positive loads are held in first capture-and-storage circuitry. Electric charges having a size depending on values of $(N-N^+)$ electric signals and corresponding absolute values of negative loads are held in second capture-and-storage circuitry. A sum of $N^+$ multiplied values obtained by multiplying each of the positive loads by each of the values of the $N^+$ electric signals is calculated when a voltage held in the first capture-and-storage circuitry reaches a first threshold. A sum of $(N-N^+)$ multiplied values obtained by multiplying each of the absolute values by each of the values of the $(N-N^+)$ electric signals is calculated when a voltage held in the second capture-and-storage circuitry reaches a second threshold A sum of N multiplied values is obtained by subtracting the sum of $(N-N^+)$ multiplied values from the sum of $N^+$ multiplied values.

3 Claims, 12 Drawing Sheets

(56) References Cited

OTHER PUBLICATIONS

T. Tohara et al., "Silicon Nanodisk Array With a Fin Field-Effect Transistor for Time-Domain Weighted Sum Calculation Toward Massively Parallel Spiking Neural Networks", Applied Physics Express 9, #034201 pp. 1-4, Feb. 12, 2016.
International Search Report, form PCT/ISA/210 dated Oct. 3, 2017 for corresponding International Application No. PCT/JP2017/028247.
Extended European Search Report dated Jul. 19, 2019 for corresponding European Application No. 17841390.2.
Iwata A., et al., A Multinanodot Floating-Gate Mosfet Circuit for Spiking Neuron Models' IEEE Transactions on Nanotechnology, IEEE Service Center, Piscataway, NJ, vol. 2, No. 3, Sep. 1, 2003, pp. 158-164 XP011100549.
Morie. Takashi et al., "An Analog-Digital Merged Neural Circuit Using Pulse Width Modulation Technique," Analog Integrated Circuits and Signal Processing, vol. 25, No. 3, pp. 319-328, 2000.

\* cited by examiner

MULTIPLY-ACCUMULATE OPERATION DEVICE

TECHNICAL FIELD

The present technology relates to a multiply-accumulate operation device performing a multiply-accumulate operation.

BACKGROUND ART

A multiply-accumulate operation is an operation in which each of loads (weights) is added to each of a plurality of input values respectively and each of the plurality of input values is added to each other, and the multiply-accumulate operation is utilized in order to recognize an image and speech by a neural network, for example. A neural network model that is multilayer-perceptron-type may be used in a multiply-accumulate operation processing. The processing may be performed by a general-purpose digital calculator or a digital application-specific-integrated-circuit, and a specific example in which the digital application-specific-integrated-circuit is utilized is described in Non-Patent Literature 1. The example in Non-Patent Literature 1 is an example in which a spiking neuron model being one method of the neural networks. The multiply-accumulate operation by the spiking neuron model is described in Non-Patent Literature 2.

Here, from a perspective of decreasing electric energy consumption of the multiply-accumulate operation processing, it is conceivable that an analog integrated circuit is more preferable than a digital integrated circuit. In order to realize the similar integration degree and the similar electric energy consumption to a brain of an organism (Ultimately, human), adoption of the analog integrated circuit is studied, and the content thereof is described in Non-Patent Literature 3.

CITATION LIST

Non-Patent Literature

Non-Patent Literature 1: P. A. Merolla et al., "A million spiking-neuron integrated circuit with a scalable communication network and interface," Science, Vol. 345, No. 6179, pp. 668-673, 2014

Non-Patent Literature 2: W. Maass, "Fast sigmoidal networks via spiking neurons," Neural Computation, vol. 9, pp. 279-304, 1997

Non-Patent Literature 3: T. Tohara et al., "Silicon nanodisk array with a fin field-effect transistor for time-domain weighted sum calculation toward massively parallel spiking neural networks," Appl. Phys. Express, Vol. 9, pp. 034201-1-4, 2016

DISCLOSURE OF INVENTION

Technical Problem

However, a processing of a multiply-accumulate operation in which positive loads and negative loads coexist with each other is not clarified in Non-Patent Literatures 2 and 3, and there is a problem that in a case that the positive loads and the negative loads exist, a way to mount the analog integrated circuit is unclear.

In view of the above circumstances, it is an object of the present invention to provide a multiply-accumulate operation device capable of performing a processing of a multiply-accumulate operation in which positive loads and negative loads coexist with each other by an analog method.

Solution to Problem

A multiply-accumulate operation device according to the present invention in accordance with the object performs a series of processing by using an analog circuit, the series of processing including causing each of N electric signals being given to correspond to each of loads, multiplies each of values of the electric signals by each of values of the loads corresponding to the electric signals to obtain N multiplied values, and derives a sum of the N multiplied values, the analog circuit includes $N^+$ first output means that cause each of $N^+$ electric signals being given in a predetermined period T1 to correspond to each of positive loads and output electric charges respectively, each of the electric charges having a size depending on each of values of the electric signals and each of values of the positive loads corresponding to the electric signals, a first capture-and-storage means to which the $N^+$ first output means are connected in parallel and in which the electric charges output from each of the $N^+$ first output means are stored, $(N-N^+)$ second output means that cause each of $(N-N^+)$ electric signals being given in the period T1 to correspond to each of absolute values of negative loads and output electric charges respectively, each of the electric charges having a size depending on each of values of the electric signals and each of the absolute values of the negative loads corresponding to the electric signals, a second capture-and-storage means to which the $(N-N^+)$ second output means are connected in parallel and in which the electric charges output from each of the $(N-N^+)$ second output means are stored, and a multiply-accumulate deriving means calculating a first multiply-accumulate value when detecting that a voltage held in the first capture-and-storage means reaches a preset first threshold, calculating a second multiply-accumulate value when detecting that a voltage held in the second capture-and-storage means reaches a preset second threshold, and obtaining the sum of the N multiplied values by subtracting the second multiply-accumulate value from the first multiply-accumulate value, the first multiply-accumulate value being a sum of $N^+$ multiplied values obtained by multiplying each of the positive loads corresponding to the $N^+$ electric signals by each of the values of the $N^+$ electric signals respectively, the second multiply-accumulate value being a sum of $(N-N^+)$ multiplied values obtained by multiplying each of the absolute values of the negative loads corresponding to the $(N-N^+)$ electric signals by each of the values of the $(N-N^+)$ electric signals respectively, the multiply-accumulate operation device, in which the first threshold has a size proportional to a product of a sum of the $N^+$ positive loads and a length of the period T1, the second threshold has a size proportional to a product of a sum of the absolute values of the $(N-N^+)$ negative loads and the length of the period T1, and the multiply-accumulate operation device derives the first multiply-accumulate value and the second multiply-accumulate value in a period T2 having the same length as the length of the period T1 after the period T1, in which the N is a natural number that is two or more, and the $N^+$ is a natural number that is the N or less.

The multiply-accumulate operation device according to the present invention, in which the multiply-accumulate operation device may add a dummy load to a smaller one of the sum of the $N^+$ positive loads or the sum of the absolute values of the $(N-N^+)$ negative loads, the dummy load corresponding to a virtual electric signal having a value 0, and being a number obtained by multiplying −1 by a difference of the sum of the $N^+$ positive loads and the sum of the absolute values of the $(N-N^+)$ negative loads, make the sum of the $N^+$ positive loads be equal to the sum of the absolute values of the $(N-N^+)$ negative loads, and obtain the sum of the N multiplied values on the basis of a difference of a first timing at which the voltage held in the first capture-and-storage means reaches the first threshold and a second timing at which the voltage held in the second capture-and-storage means reaches the second threshold.

The multiply-accumulate operation device according to the present invention, in which a plurality of the analog circuits may be hierarchically connected via switch mechanisms, each of the switch mechanisms may transmit the sum of the N multiplied values that each of the analog circuits in a lower layer obtains to each of the analog circuits in an upper layer in a case that the first timing is the same as the second timing, or, in a case that the first timing is earlier than the second timing, and each of the switch mechanisms may transmit the value 0 to each of the analog circuits in the upper layer in a case that the first timing is later than the second timing.

Advantageous Effects of Invention

A multiply-accumulate operation device according to the present invention may perform a multiply-accumulate operation in which positive loads and negative loads coexist with each other by an analog method, because an analog circuit in the multiply-accumulate operation device includes $N^+$ first output means that cause each of $N^+$ electric signals being given in a predetermined period T1 to correspond to each of positive loads and output electric charges respectively, each of the electric charges having a size depending on each of values of the electric signals and each of values of the positive loads corresponding to the electric signals, a first capture-and-storage means in which the electric charges output from each of the $N^+$ first output means are stored, $(N-N^+)$ second output means that cause each of $(N-N^+)$ electric signals being given in the period T1 to correspond to each of absolute values of negative loads and output electric charges respectively, each of the electric charges having a size depending on each of values of the electric signals and each of the absolute values of the negative loads corresponding to the electric signals, a second capture-and-storage means in which the electric charges output from each of the $(N-N^+)$ second output means are stored, and a multiply-accumulate deriving means calculating a first multiply-accumulate value when detecting that a voltage held in the first capture-and-storage means reaches a first threshold, calculating a second multiply-accumulate value when detecting that a voltage held in the second capture-and-storage means reaches a second threshold, and obtaining a sum of the N multiplied values by subtracting the second multiply-accumulate value from the first multiply-accumulate value, the first multiply-accumulate value being a sum of $N^+$ multiplied values obtained by multiplying each of the positive loads corresponding to the $N^+$ electric signals by each of the values of the $N^+$ electric signals respectively, the second multiply-accumulate value being a sum of $(N-N^+)$ multiplied values obtained by multiplying each of the absolute values of the negative loads corresponding to the $(N-N^+)$ electric signals by each of the values of the $(N-N^+)$ electric signals respectively. Moreover, the multiply-accumulate operation device may derive the first multiply-accumulate value and the second multiply-accumulate value in a period T2 having the same length as the length of the period T1 after the period T1, and it is possible that the analog circuit has a simpler structure. Furthermore, the multiply-accumulate operation device independently executes each of multiply-accumulate operations about the positive loads and the negative loads in the same-type circuit respectively, and a movement of each of the electric charges is only in one direction. As a result, decreasing electric energy consumption of each of circuit operations may be realized.

MODE(S) FOR CARRYING OUT THE INVENTION

Subsequently, with reference to the attached drawings, embodiments specifying the present invention will be described and offered for understanding the present invention.

Figure 1:
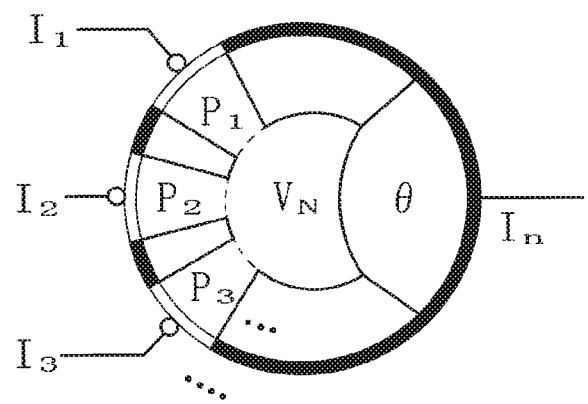
FIGS. 1 (A) and (B) are explanatory diagrams showing each of analog circuits included in a multiply-accumulate operation device according to a first embodiment of the present invention, and each of calculation timings at which each of the analog circuits calculates each of calculated-object values, respectively.
Figure 1:
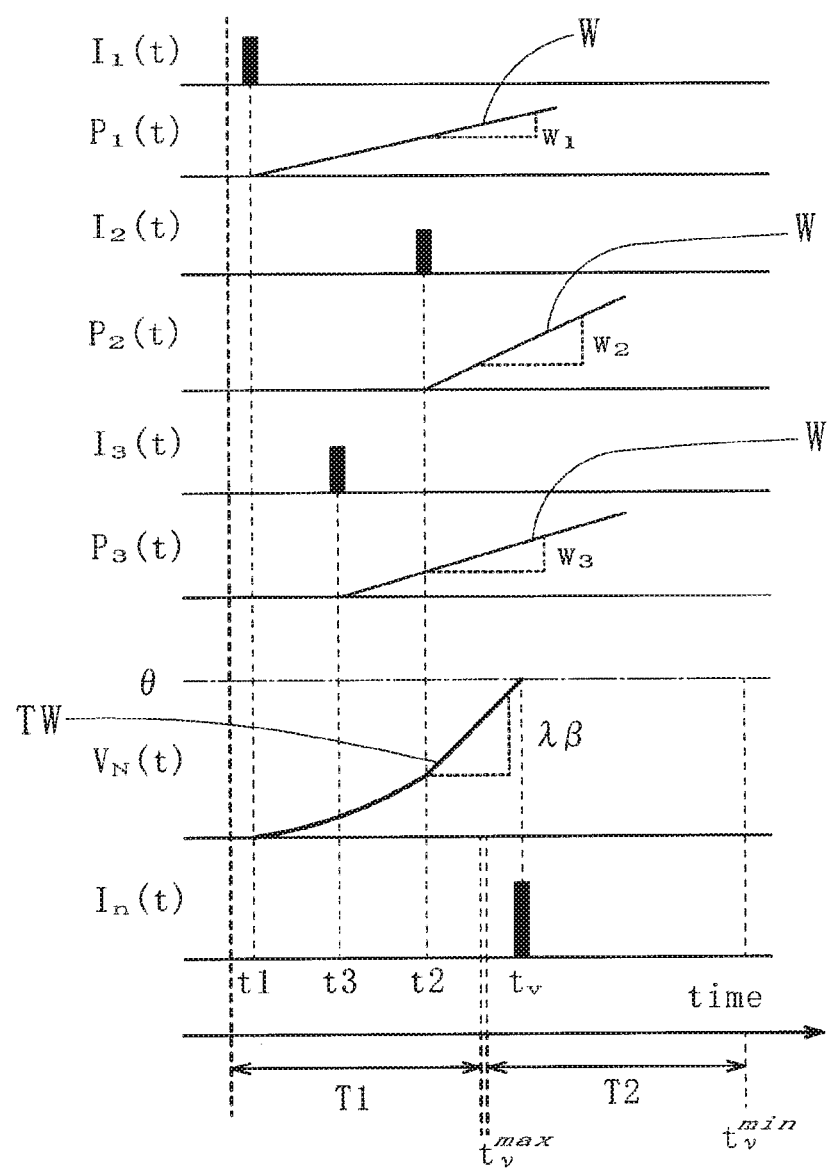

As shown in FIGS. 1 (A), 1 (B), and 2, a multiply-accumulate operation device 10 according to a first embodiment of the present invention is a device that performs a series of processing by using analog circuits 11, the series of processing including causing each of N electric signals $I_i$ being given to each of the analog circuits 11 to correspond to each of loads (weights) $w_i$, multiplying each of values of the electric signals $I_i$ by each of values of the loads $w_i$ corresponding to the electric signals $I_i$ to obtain N multiplied values, and deriving a sum of the N multiplied values, where the N is a natural number that is two or more, and the i is a natural number that is the N or less (i=1, 2, ..., N). Hereinafter, the multiply-accumulate operation device 10 will be described in detail.

A value of the electric signal $I_i$ (Hereinafter, simply referred to as "electric signal") is referred to as $x_i$, and the N electric signals (In the present embodiment, pulse signals) are given to the one analog circuit 11 in a predetermined period T1. A calculated-object value of the analog circuit 11 (In other words, the sum of the N multiplied values) is shown as below.

[Math. 1]

$$\sum_{i=1}^{N} w_i \cdot x_i$$

Figure 2:
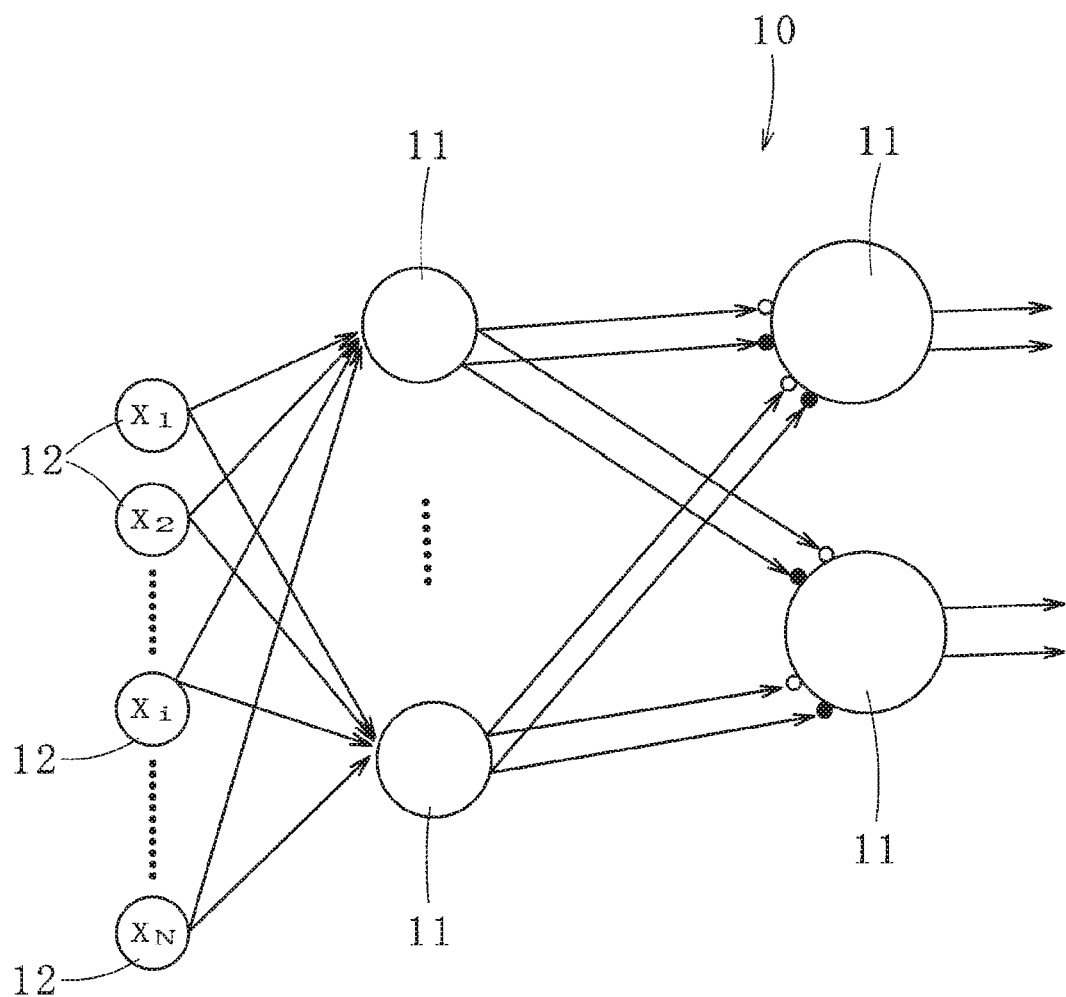
FIG. 2 An explanatory diagram showing the multiply-accumulate operation device.

As shown in FIG. 2, the multiply-accumulate operation device 10 has a structure in which the plurality of analog circuits 11 are provided in each of a plurality of layers respectively. Each of the plurality of analog circuits 11 in the lowest layer obtains the calculated-object value on the basis of the values $x_i$ of the N (plural) electric signals (In the present embodiment, pulse signals) given from a plurality of input parts 12 and the loads $w_i$ applied to the electric signals respectively, and transmits electric signals indicating the calculated-object value to the analog circuits 11 in an upper layer.

Each of the analog circuits 11 in the upper layer obtains the calculated-object value by causing each of the values of the electric signals transmitted from the plurality of analog circuits 11 in the lowest layer (In other words, lower layer) to correspond to each of the loads $w_i$ respectively, and transmits electric signals indicating the calculated-object value to the analog circuits 11 in a further upper layer. In the present embodiment, the multiply-accumulate operation device 10 is designed to be applicable to a neural network, and by performing a processing in which each of the analog circuits 11 in the upper layer obtains the calculated-object value on the basis of the calculated-object value obtained in each of the analog circuits 11 in the lower layer a plurality of times, for example, the multiply-accumulate operation device 10 performs recognition of an image and the like.

First, a structure of an analog circuit 11a according to a reference example in which the analog circuit 11a obtains the calculated-object value by performing basically the same processing as the processing performed by the analog circuit 11 and the processing performed by the analog circuit 11a will be described where the value $x_i$ of the electric signal is a variable that is 0 or more and 1 or less. Note that the load $w_i$ includes a positive load $wi^+$ and a negative load $wi^-$, (because the positive load $wi^+$ and the negative load $wi^-$ are calculated independently) and in the analog circuit 11a. However, the load $w_i$ is considered to have no difference between the positive load $wi^+$ and the negative load $wi^-$.

Figure 3:
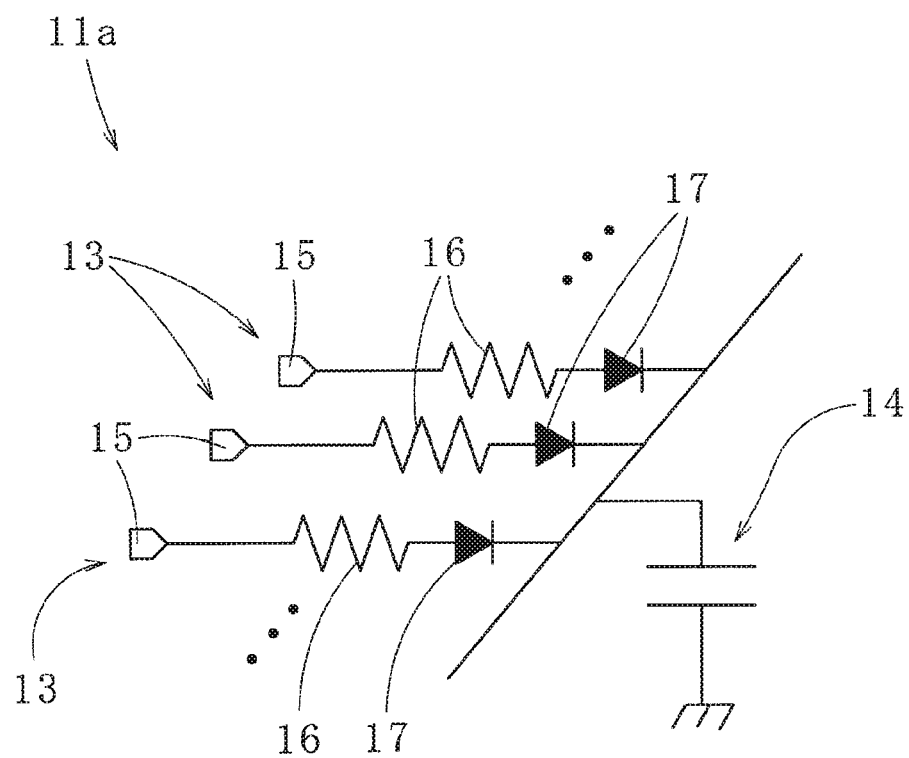
FIG. 3 An explanatory diagram showing a reference example of the analog circuit.

As shown in FIG. 3, the analog circuit 11a includes N output means 13 that cause each of the N electric signals given in the period T1 to correspond to each of loads wi and output electric charges respectively, each of the electric charges having a size depending on each of the values of the electric signals and each of values of the loads wi corresponding to the electric signals, and a capture-and-storage means 14 to which the N output means 13 are connected in parallel and in which the electric charges output from each of the N output means 13 are stored.

Each of the output means 13 includes an input terminal 15 to which each of the electric signals is given, a resistance 16 to which the input terminal 15 is connected in series, and a diode 17 to which the resistance 16 is connected in series. A size of the load wi of each of the output means 13 may be determined by a resistance value of each of the resistances 16.

Electric signals having different sizes are given to the input terminal 15 of each of the output means 13 at different timings in the period T1.

A length of the period T1 is referred to as $T_{in}$, and the timing at which the electric signals are given to the input terminals 15 of the output means 13 is referred to as $t_i$. As shown in FIG. 1 (B), in the analog circuit 11a, the value $x_i$ of each of the electric signals given to the input terminals 15 is converted to the timing $t_i$ at which each of the electric signals is given by using an equation 1 described below.

[Math. 2]

$$t_i = T_{in}(1-x_i) \qquad \text{(Equation 1)}$$

Where a waveshape that is produced from the timing $t_i$ at which the electric signal is given and increases or decreases proportionally to elapse of time t is referred to as response-waveshape W (See FIG. 1 (B)), an electric-charge amount $P_i(t)$ that shows an amount of the electric charge supplied with the capture-and-storage means 14 from each of the output means 13 may be shown by a size of the response-waveshape W. Where an inclination of fluctuation of the response-waveshape W with regard to the elapse of the time $t_i$ is referred to as $k_i$, an equation 2 described below is applicable to convert the load wi to the $k_i$.

[Math. 3]

$$k_i = \lambda w_i \qquad \text{(Equation 2)}$$

Note that $\lambda$ is a positive constant.

Here, as shown in FIG. 1 (B), a waveshape formed by adding all of the response-waveshapes W is referred to as compositive waveshape TW. A size of the compositive waveshape TW is a sum of $P_1(t), P_2(t), P_3(t), \ldots, P_N(t)$, and is equal to a voltage that is produced by the electric charge stored in the capture-and-storage means 14. The size of the compositive waveshape TW, in other words, the voltage held in the capture-and-storage means 14 is referred to as $V_N(t)$. When the $V_N(t)$ reaches a preset threshold (A size of the threshold is referred to as $\theta$), a pulse signal corresponding to the voltage held in the capture-and-storage means 14 is output. A timing at which the $V_N(t)$ reaches the threshold $\theta$ is referred to as $t_v$, and as a result, an equation 3 described below is obtained.

[Math. 4]

$$\sum_{i=1}^{N} k_i(t_v - t_i) = \theta \qquad \text{(Equation 3)}$$

$\beta$ is a sum of the loads wi, and the $\beta$ is expressed by an equation 4 described below.

[Math. 5]

$$\beta = \sum_{i=1}^{N} w_i \qquad \text{(Equation 4)}$$

On the basis of the equations 1 to 4, a calculated-object value of the analog circuit 11*a* is expressed by an equation 5 described below.

[Math. 6]

$$\sum_{i=1}^{N} w_i \cdot x_i = \frac{\theta/\lambda + \beta(T_{in} - t_v)}{T_{in}} \qquad \text{(Equation 5)}$$

Here, all of the loads wi are assumed to be positive values. When the value $x_i$ of each of the electric signals given to all of the input terminals 15 is the minimum value 0, the left side of the equation 5 is 0. As a result, the timing $t_v$ is the latest, and the timing $t_v^{min}$ is expressed by an equation 6 described below.

[Math. 7]

$$t_v^{min} = \frac{\theta}{\lambda\beta} + T_{in} \qquad \text{(Equation 6)}$$

That the left side of the equation 5 is 0 means that an output timing corresponding to the voltage held in the capture-and-storage means 14 is the latest.

On the other hand, when the value $x_i$ of each of the electric signals given to all of the input terminals 15 is the maximum value 1, the left side of the equation 5 is β. As a result, the timing $t_v$ is the earliest, and the timing $t_v^{max}$ is expressed by an equation 7 described below.

[Math. 8]

$$t_v^{max} = \frac{\theta}{\lambda\beta} \qquad \text{(Equation 7)}$$

That the left side of the equation 5 is β means that an output timing corresponding to the electric-charge amount stored in the capture-and-storage means 14 is the earliest. As a result, on the basis of the equations 6 and 7, a period T2 in which the pulse signal corresponding to the voltage held in the capture-and-storage means 14 is output is $[t_v^{max}, t_v^{min}]$, and a time length $T_v$ of the period T2 is given by an equation 8 described below.

[Math. 9]

$$T_v = t_v^{min} - t_v^{max} = T_{in} \qquad \text{(Equation 8)}$$

Thus, the time length $T_v$ of the period T2 in which the pulse signal corresponding to the voltage held in the capture-and-storage means 14 is output is equal to the time length $T_{in}$ of the period T1 in which the electric signal is given to each of the output means 13.

To make the calculated-object value of the analog circuit 11*a* to reflect all of the electric signals given to each of the output means 13, it is necessary that the period T2 exists after the period T1 and the θ is a suitable value. Thus, a condition expressed by an equation 9 described below is necessary.

[Math. 10]

$$t_v^{max} > T_{in} \qquad \text{(Equation 9)}$$

On the basis of the equation 7, the equation 9 may be replaced with an equation 10 described below.

[Math. 11]

$$\theta > \lambda\beta T_{in} \qquad \text{(Equation 10)}$$

Here, a minute number ε (>0) is defined. By using the ε, the threshold θ is expressed by an equation 11 described below.

[Math. 12]

$$\theta = (1+\varepsilon)\lambda\beta T_{in} \qquad \text{(Equation 11)}$$

On the basis of the equation 11, it is necessary for the threshold θ to have a size proportional to a product of the sum β of the loads wi and the length $T_{in}$ of the period T1.

Moreover, an equation 12 described below is obtained by the equations 6 and 11, and an equation 13 described below is obtained by the equations 7 and 11.

[Math. 13]

$$t_v^{min} = 2T_{in} + \varepsilon T_{in} \qquad \text{(Equation 12)}$$

[Math. 14]

$$t_v^{max} = T_{in} + \varepsilon T_{in} \qquad \text{(Equation 13)}$$

Thus, a time range of the period T2 may be expressed by the equations 12 and 13.

Next, the analog circuits 11 obtaining the calculated-object values where the loads wi are separated into the positive loads $wi^+$ and the negative loads $wi^-$ will be described.

Each of the analog circuits 11 causes each of $N^+$ (The $N^+$ is a natural number that is the N or less) electric signals of the N electric signals given in the period T1 to correspond to each of the positive loads $wi^+$, and causes each of ($N-N^+$) electric signals of the N electric signals given in the period T1 to correspond to each of absolute values of the negative loads $wi^-$.

Figure 4:
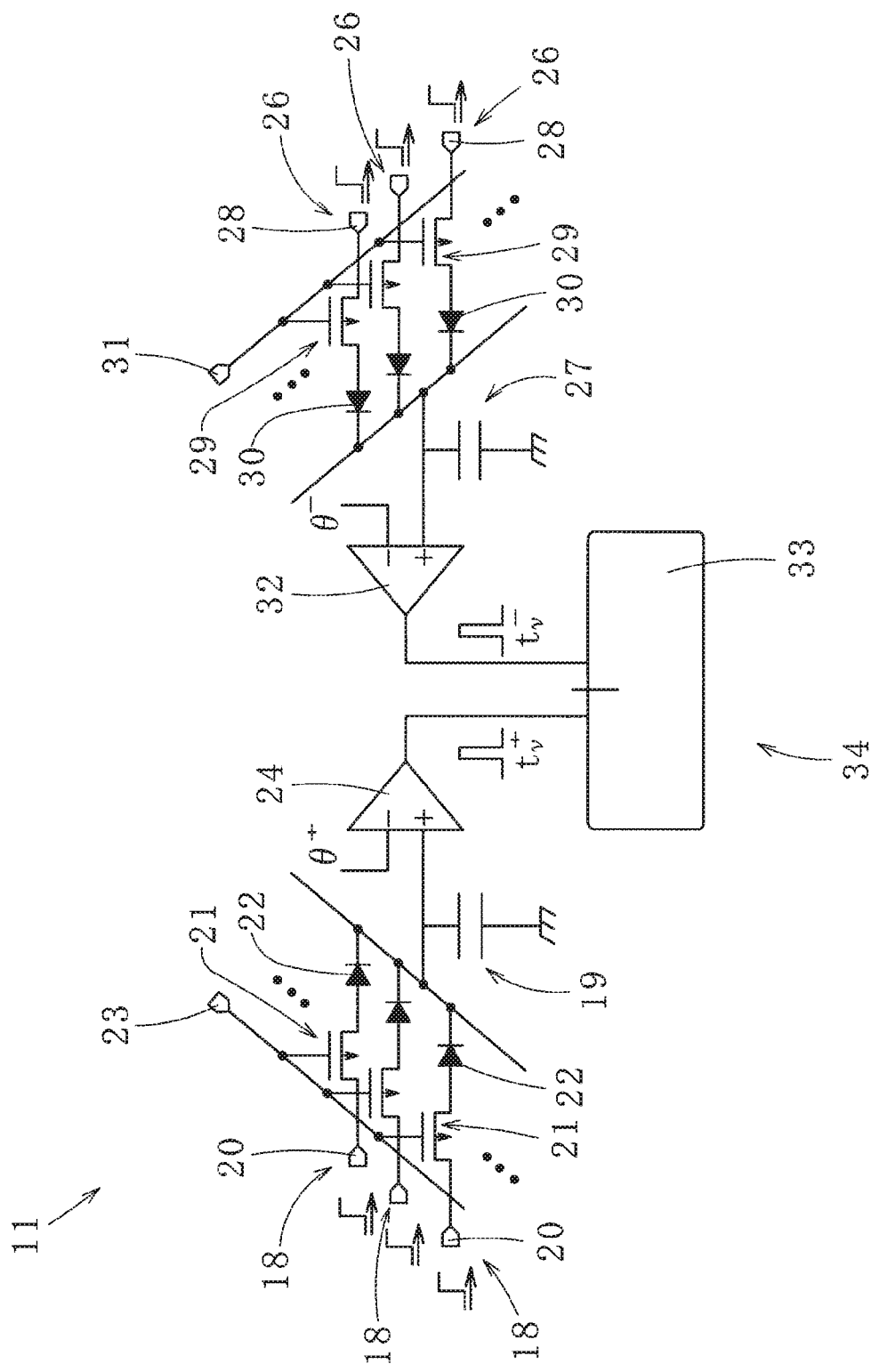
FIG. 4 A circuit diagram showing each of the analog circuits included in the multiply-accumulate operation device.

As shown in FIG. 4, the analog circuit 11 includes $N^+$ first output means 18 that output electric charges having sizes depending on each of values of the $N^+$ electric signals given in the period T1 and each of values of the positive loads $wi^+$ corresponding to the $N^+$ electric signals respectively, and a first capture-and-storage means 19 to which the $N^+$ first output means 18 are connected in parallel and in which the electric charges output from each of the $N^+$ first output means 18 are stored. Each of the first output means 18 corresponds to each of the positive loads $wi^+$.

Each of the first output means 18 includes an input terminal 20 to which the electric signal is given, a PMOS transistor 21, a source side of the PMOS transistor 21 is connected to the input terminal 20, and a diode (rectifier) 22 that is connected to a drain side of the PMOS transistor 21. A voltage-output terminal 23 that gives a gate voltage (bias voltage) to each of the PMOS transistors 21 is connected to each of the first output means 18, and each of the first output means 18 has a state in which the same resistance is produced in the PMOS transistor 21 of each of the first output means 18.

In the present embodiment, the first capture-and-storage means 19 is a capacitor (capable of diverting a gate capacitance of a MOS transistor), and a signal-transmission part 24 that outputs a pulse signal at a timing (Hereinafter, the timing is also referred to as "first timing") at which a voltage held in the first capture-and-storage means 19 reaches a preset first threshold is connected to the first capture-and-storage means 19. A size of the voltage held in the first capture-and-storage means 19 is determined by an amount of the electric charge stored in the first capture-and-storage means 19.

Moreover, the analog circuit 11 includes $N^-$ ($N^-=N-N^+$) second output means 26 that cause each of the $N^-$ electric signals given in the period T1 to correspond to each of the absolute values of the negative loads $w_i^-$ and output electric charges having sizes depending on each of values of the $N^-$ electric signals given in the period T1 and each of the absolute values of the negative loads $w_i^-$ corresponding to the $N^-$ electric signals respectively, and a second capture-and-storage means 27 to which the $N^-$ second output means 26 are connected in parallel and in which the electric charges output from each of the $N^-$ second output means 26 are stored. Each of the second output means 26 corresponds to each of the negative loads $w_i^-$.

Thus, a period in which the $N^+$ electric signals are given to the $N^+$ the first output means 18 coincides with a period in which the $N^-$ electric signals are given to the $N^-$ second output means 26.

Each of the second output means 26 includes an input terminal 28 to which the electric signal is given, a PMOS transistor 29, a source side of the PMOS transistor 29 is connected to the input terminal 28, and a diode 30 that is connected to a drain side of the PMOS transistor 29. A voltage-output terminal 31 that gives a gate voltage to each of the PMOS transistors 29 is connected to each of the second output means 26, and each of the second output means 26 has a state in which the same resistance is produced in the PMOS transistor 29 of each of the second output means 26. A size of the load $w_i^+$ of each of the first output means 18 is determined by the PMOS transistor 21 of each of the first output means 18, and a size of the absolute value of the load $w_i^-$ of each of the second output means 26 is determined by the PMOS transistor 29 of each of the second output means 26.

In the present embodiment, the second capture-and-storage means 27 is a capacitor (capable of diverting a gate capacitance of a MOS transistor), and a signal-transmission part 32 that outputs a pulse signal at a timing (Hereinafter, the timing is also referred to as "second timing") at which a voltage held in the second capture-and-storage means 27 reaches a preset second threshold is connected to the second capture-and-storage means 27. A size of the voltage held in the second capture-and-storage means 27 is determined by an amount of the electric charge stored in the second capture-and-storage means 27. Here, a size of the first threshold is referred to as $\theta^+$, a size of the second threshold is referred to as $\theta^-$, a sum of the $N^+$ positive loads $w_i^+$ is referred to as $\beta^+$, and a sum of the absolute values of the $N^-$ negative loads $w_i^-$ is referred to as $\beta^-$. The $\beta^+$ and the $\beta^-$ are expressed by equations 14 and 15 described below respectively.

[Math. 15]

$$\beta^+ = \sum_{i=1}^{N^+} w_i^+ \quad \text{(Equation 14)}$$

[Math. 16]

$$\beta^- = \sum_{i=1}^{N^-} |w_i^-| \quad (>0) \quad \text{(Equation 15)}$$

Where the first timing is referred to as $t_v^+$ and the second timing is referred to as $t_v^-$, on the basis of $N=N^++N^-$, $\beta=\beta^+-\beta^-$, and the equation 3, the $\theta^+$ and $\theta^-$ are expressed by equations 16 and 17 described below respectively.

[Math. 17]

$$\sum_{i=1}^{N^+} w_i^+(t_v^+ - t_i) = \theta^+ \quad \text{(Equation 16)}$$

[Math. 18]

$$\sum_{i=1}^{N^-} |w_i^-|(t_v^- - t_i) = \theta^- \quad (>0) \quad \text{(Equation 17)}$$

Note that, in the equations 16 and 17, $\lambda=1$ is assumed.

Thus, where the calculated-object value (sum of N multiplied values) is separated into the positive loads $w_i^+$ and the negative loads $w_i^-$, equations 18 and 19 described below are obtained.

[Math. 19]

$$\sum_{i=1}^{N^+} w_i^+ \cdot x_i = \frac{\theta^+ + \beta^+(T_{in} - t_v^+)}{T_{in}} \quad \text{(Equation 18)}$$

[Math. 20]

$$\sum_{i=1}^{N^-} |w_i^-| \cdot x_i = \frac{\theta^- + \beta^-(T_{in} - t_v^-)}{T_{in}} \quad \text{(Equation 19)}$$

In the present embodiment, a value calculated by the equation 18 is referred to as a first multiply-accumulate value (sum of $N^+$ multiplied values obtained by multiplying each of the positive loads $w_i^+$ corresponding to the $N^+$ electric signals by each of the values of the $N^+$ electric signals respectively), and a value calculated by the equation 19 is referred to as a second multiply-accumulate value (sum of $N^-$ multiplied values obtained by multiplying each of the absolute values of the negative loads $w_i^-$ corresponding to the $N^-$ electric signals by each of the values of the $N^-$ electric signals respectively). As shown in FIG. 4, the analog circuit 11 includes an arithmetic part 33 that derives the calculated-object value by subtracting the second multiply-accumulate value from the first multiply-accumulate value. The arithmetic part 33 is connected to the signal-transmission parts 24 and 32, calculates the first multiply-accumulate value when detecting that the pulse signal is transmitted from the signal-transmission part 24, and calculates the second multiply-accumulate value when detecting that the pulse signal is transmitted from the signal-transmission part 32.

Thus, the arithmetic part 33 calculates the first multiply-accumulate value when detecting that the voltage held in the first capture-and-storage means 19 reaches the first threshold $\theta^+$, and calculates the second multiply-accumulate value when detecting that the voltage held in the second capture-and-storage means 27 reaches the second threshold $\theta^-$. As a result, the arithmetic part 33 obtains the calculated-object value by subtracting the second multiply-accumulate value from the first multiply-accumulate value. In the present embodiment, the signal-transmission parts 24 and 32 and the arithmetic part 33 are mainly included in a multiply-accumulate deriving means 34 deriving the calculated-object value.

An equation for obtaining the calculated-object value is expressed by an equation 20 described below.

[Math. 21]

$$\sum_{i=1}^{N} w_i \cdot x_i = \frac{\theta^+ - \theta^- + \beta T_{in} - (\beta^+ t_v^+ - \beta^- t_v^-)}{T_{in}} \quad \text{(Equation 20)}$$

Here, it is assumed that the arithmetic part 33 calculates the first multiply-accumulate value and the second multiply-accumulate value in the period T2. To make the calculated-object value to reflect all of the electric signals given to each of the first output means 18 and all of the electric signals given to each of the second output means 26, it is necessary that the period T2 exists after the period T1. Both of the time length of the period T1 and the time length of the period T2 are the $T_{in}$. Thus, it is necessary for the first threshold $\theta^+$ and the second threshold $\theta^-$ to satisfy equations 21 and 22 described below respectively.

[Math. 22]

$$\theta^+ = (1+\varepsilon)\lambda\beta^+ T_{in} \quad \text{(Equation 21)}$$

[Math. 23]

$$\theta^- = (1+\varepsilon)\lambda\beta^- T_{in} \quad \text{(Equation 22)}$$

By the equations 21 and 22, the first threshold $\theta^+$ is made to have a size proportional to a product of the sum $\beta^+$ of the $N^+$ loads $w_i^+$ and the length $T_{in}$ of the period T1, and the second threshold $\theta^-$ is made to have a size proportional to a product of the sum $\beta^-$ of the absolute values of the $N^-$ loads $w_i^-$ and the length $T_{in}$ of the period T1. As a result, it is shown that all of the electric signals given to each of the first output means 18 and all of the electric signals given to each of the second output means 26 may be reflected by the calculated-object value. In the present embodiment, the values $\theta^+$ and $\theta^-$ are set in order that the equations 21 and 22 are satisfied respectively.

Figure 5:
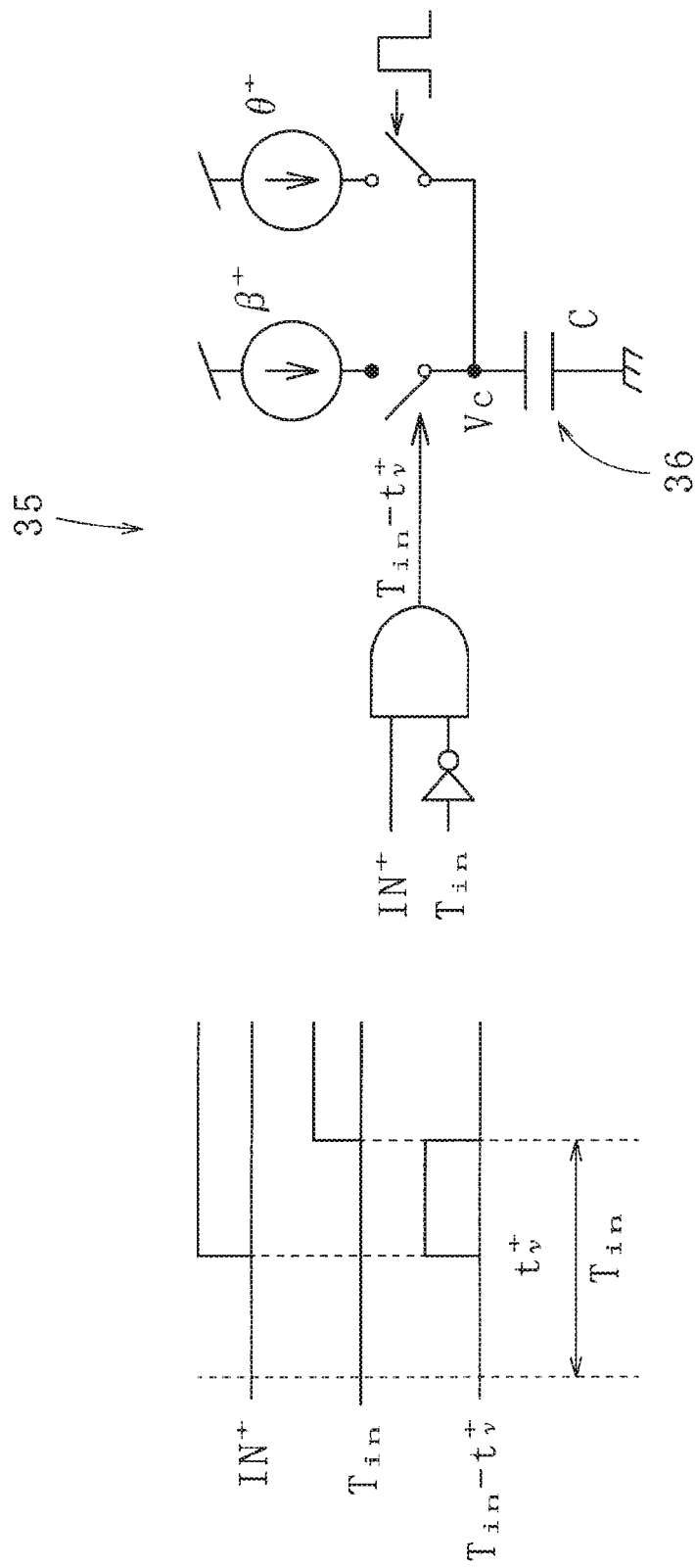
FIG. 5 An explanatory diagram showing a modified example of an arithmetic part.

Moreover, a product of the $t_v^+$ and the $\beta^+$ and a product of the $t_v^-$ and the $\beta^-$ exist on the right side of the equation 20, and to calculate the calculated-object value on the basis of the equation 20, a circuit unit 35 being analog in FIG. 5 is needed for each of the positive load $w_i^+$ and the negative load $w_i^-$ respectively in the arithmetic part. As a result, it is necessary for the arithmetic part to have a complex circuit structure. Note that the circuit unit 35 in FIG. 5 corresponds to the equation 18 and is for the positive load $w_i^+$, and an electric charge proportional to the $\theta^+$ and the $\beta^+$ $(T_{in}-t_v^+)$ may be stored in a capacitor 36.

Thus, in the present embodiment, to make the circuit structure of the arithmetic part 33 simple, an absolute value of a dummy load $w_0$ (The $w_0$ is expressed by an equation 23 described below) that corresponds to a virtual electric signal having a value 0 and is obtained by multiplying −1 by a difference of the $\beta^+$ (In other words, the sum of the $N^+$ positive loads $w_i^+$) and the $\beta^-$ (In other words, the sum of the absolute values of the $N^-$ negative loads $w_i^-$) is added to a smaller one of the $\beta^+$ or the $\beta^-$.

[Math. 24]

$$w_0 = -(\beta^+ - \beta^-) \quad \text{(Equation 23)}$$

By adding the dummy load $w_0$, the $\beta^+$ and the $\beta^-$ are equal to each other. At this time, $\beta^+ = \beta^-$, and on the basis of the equations 21 and 22, $\theta^+ = \theta^-$. Thus, where $\beta^+ = \beta^- = \beta_0$ is assumed, the equation 20 may be replaced with an equation 24 described below.

[Math. 25]

$$\sum_{i=1}^{N} w_i \cdot x_i = \frac{\beta_0(t_v^- - t_v^+)}{T_{in}} \quad \text{(Equation 24)}$$

On the basis of the equation 24, where the positive loads $w_i^+$ and the negative loads $w_i^-$ coexist with each other, the calculated-object value is obtained on the basis of a difference of the first timing and the second timing.

Figure 6:
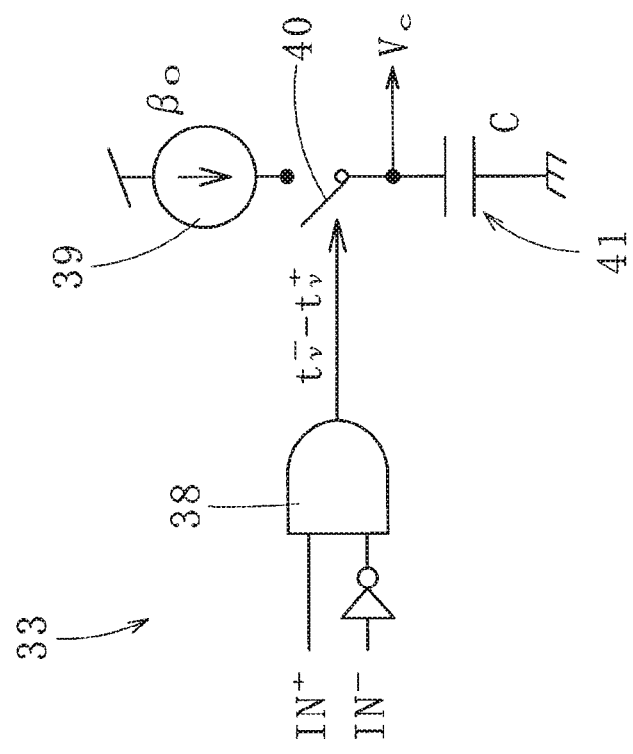
FIG. 6 An explanatory diagram showing the arithmetic part included in the multiply-accumulate operation device.
Figure 6:
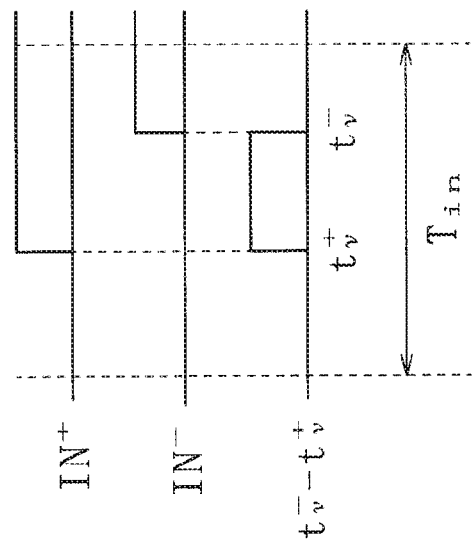

As shown in FIG. 6, the arithmetic part 33 includes an AND gate 38, an electric-current supply terminal 39 supplying electric current having the size $\beta_0$, a switch 40, and a capacitor 41. The AND gate 38 connects the electric-current supply terminal 39 to the capacitor 41 by the switch 40 and makes the electric-current supply terminal 39 supply the electric current with the capacitor 41 only in a period of a state (IN$^+$ is on-state) in which the voltage held in the first capture-and-storage means 19 reaches the first threshold $\theta^+$ and a state (IN$^-$ is off-state) in which the voltage held in the second capture-and-storage means 27 does not reach the second threshold $\theta^-$. Due to this, the capacitor 41 is charged with an electric charge proportional to the $\beta_0\{(t_v^-)-(t_v^+)\}$, and a voltage having a size proportional to the $\beta_0\{(t_v^-)-(t_v^+)\}$ may be obtained. As a result, the calculated-object value may be derived by the equation 24.

Figure 7:
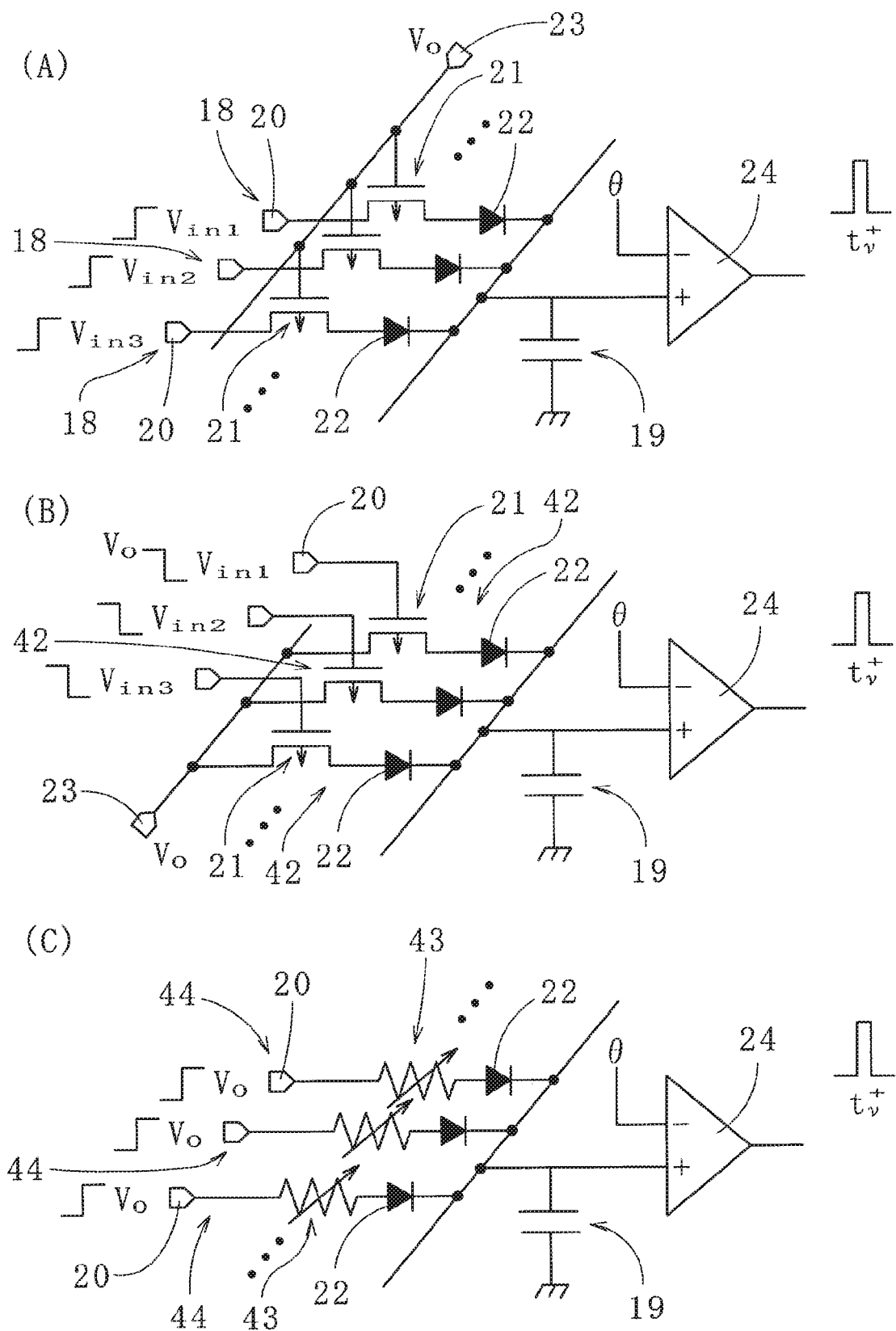
FIGS. 7 (A), (B), and (C) are circuit diagrams showing each of the analog circuits included in the multiply-accumulate operation device, a first modified example of the analog circuit, and a second modified example of the analog circuit, respectively.

As shown in FIGS. 4 and 7 (A), in the present embodiment, the electric signals from each of the input terminals 20 are supplied with each of the sources of the PMOS transistors 21 at different timings, and the voltage from the one voltage-output terminal 23 is given to each of gates of the PMOS transistors 21. However, this is not limitative.

As shown in FIG. 7 (B), for example, the electric signals (voltages) from each of the input terminals 20 may be given to each of the gates of the PMOS transistors 21 at different timings, the electric signal (voltage) from the one voltage-output terminal 23 may be given to each of the sources of the PMOS transistors 21, and a resistance value of each of first output means 42 may be changed. As shown in FIG. 7 (C), alternatively, first output means 44 on which a variable resistance 43 is provided may be adopted, and the electric signals (voltage pulse) having the same sizes may be given to each of the input terminals 20 of the first output means 44 at different timings.

As shown in FIGS. 7 (A) and (B), in a case that the MOS transistors are used in the analog circuit, a difference between the voltage of the input terminal and the voltage of the output terminal may automatically prevent countercurrent as described below, and the analog circuit has an advantage of not needing the diodes. Thus, for example, when a threshold voltage of each of the PMOS transistors 21 is −0.7 V, it is assumed that 0.6 V is applied to the voltage-output terminal 23, and a step voltage rising from 0 V to 1 V at a predetermined timing is given to each of the input terminals 20. Where the detection threshold θ of the signal-transmission part 24 is 0.3 V, the terminal voltage of the capacitor that is the first capture-and-storage means 19 has a value 0 V to 0.3 V. At this time, when the step voltage is 1 V, a side of each of the input terminals 20 is the source of each of the PMOS transistors 21, and a side of the capacitor terminal is the drain. As a result, a voltage between the gate and the source is −0.4 V, and the electric current flows in a subthreshold region of each of the PMOS transistors 21. On the other hand, when the step voltage is 0 V, the side of each of the input terminals 20 is the drain, and the side of the capacitor terminal is the source. As a result, the voltage between the gate and the source gate is +0.3 V to +0.6 V, and the electric current hardly flows. In this manner, a countercurrent-prevention function may be realized only by the MOS transistors, and it is not necessary for the diodes to be inserted.

Moreover, the present invention may be applied to a spiking neural network model showing information by spike pulses. Hereinafter, with reference to FIGS. 8 and 9, a multiply-accumulate operation device 50 according to a second embodiment of the present invention that is applicable to a spiking neural network model will be described. Note that the same reference symbols are attached to the similar structures of the multiply-accumulate operation device 50 to the structures of the multiply-accumulate operation device 10, and descriptions thereof in detail will be omitted.

Figure 8:
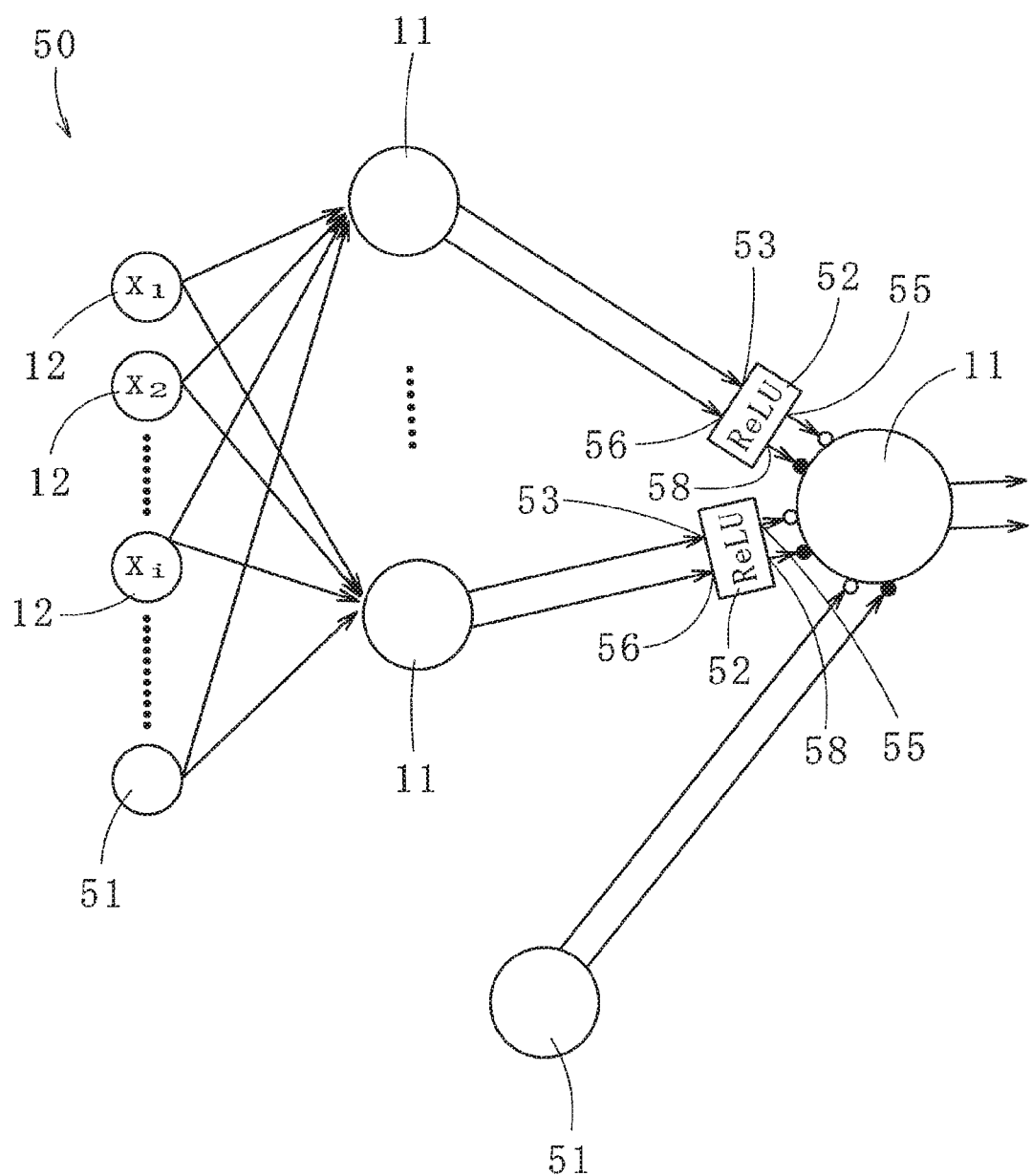
FIG. 8 An explanatory diagram showing a multiply-accumulate operation device according to a second embodiment of the present invention.

As shown in FIG. 8, the plurality of analog circuits 11 are provided in each of a plurality of layers of the multiply-accumulate operation device 50, and the plurality of input parts 12 and a signal output terminal 51 that gives a bias value to each of the analog circuits 11 are connected to each of the plurality of analog circuits 11 in the lowest layer.

In a normal neural network model, a bias value is input to a neuron. Thus, the signal output terminal 51 gives an electric signal indicating a value 1 as the bias value to each of the analog circuits 11, and as a result, the multiply-accumulate operation device 50 treats the bias value input to the neuron by a multiply-accumulate operation.

The neural network model repeats a processing in which a value obtained by the multiply-accumulate operation in each of the neurons is transformed nonlinearly by an activation function f expressed by an equation 25 described below and is delivered to each of the neurons in an upper layer.

[Math. 26]

$$y = f\left(\sum_{i=1}^{N} w_i \cdot x_i\right) \quad \text{(Equation 25)}$$

In a deep neural network model in recent years, a so-called lamp function or ReLU function (See equation 26 described below) is used as the activation function.

[Math. 27]

$$ReLU(x) = \begin{cases} x & \text{if } x \geq 0 \\ 0 & \text{otherwise} \end{cases} \quad \text{[Equation 26]}$$

Thus, in the multiply-accumulate operation device 50, ReLU function circuits (an example of a switch mechanism) 52 performing processings of the ReLU function (an example of the activation function) are provided between each of the layers, and the plurality of analog circuits 11 are hierarchically connected via the ReLU function circuits 52.

In a case that the calculated-object value obtained by each of the analog circuits 11 in the lower layer is positive or 0, each of the ReLU function circuits 52 transmits the electric signals indicating the calculated-object value to each of the analog circuits 11 in the upper layer as they are, and in a case that the calculated-object value output from each of the analog circuits 11 in the lower layer is negative, each of the ReLU function circuits 52 transmits electric signals indicating a value 0 (zero) to each of the analog circuits 11 in the upper layer.

In the case that the calculated-object value is positive, on the basis of $t_v^+ \leq t_v^-$, each of the ReLU function circuits 52 transmits the electric signals indicating the calculated-object value to each of the analog circuits 11 in the upper layer in a case that the first timing is the same as the second timing, or, in a case that the first timing is earlier than the second timing. In a case that the first timing is later than the second timing, each of the ReLU function circuits 52 transmits the electric signals indicating the value 0 to each of the analog circuits 11 in the upper layer.

Figure 9:
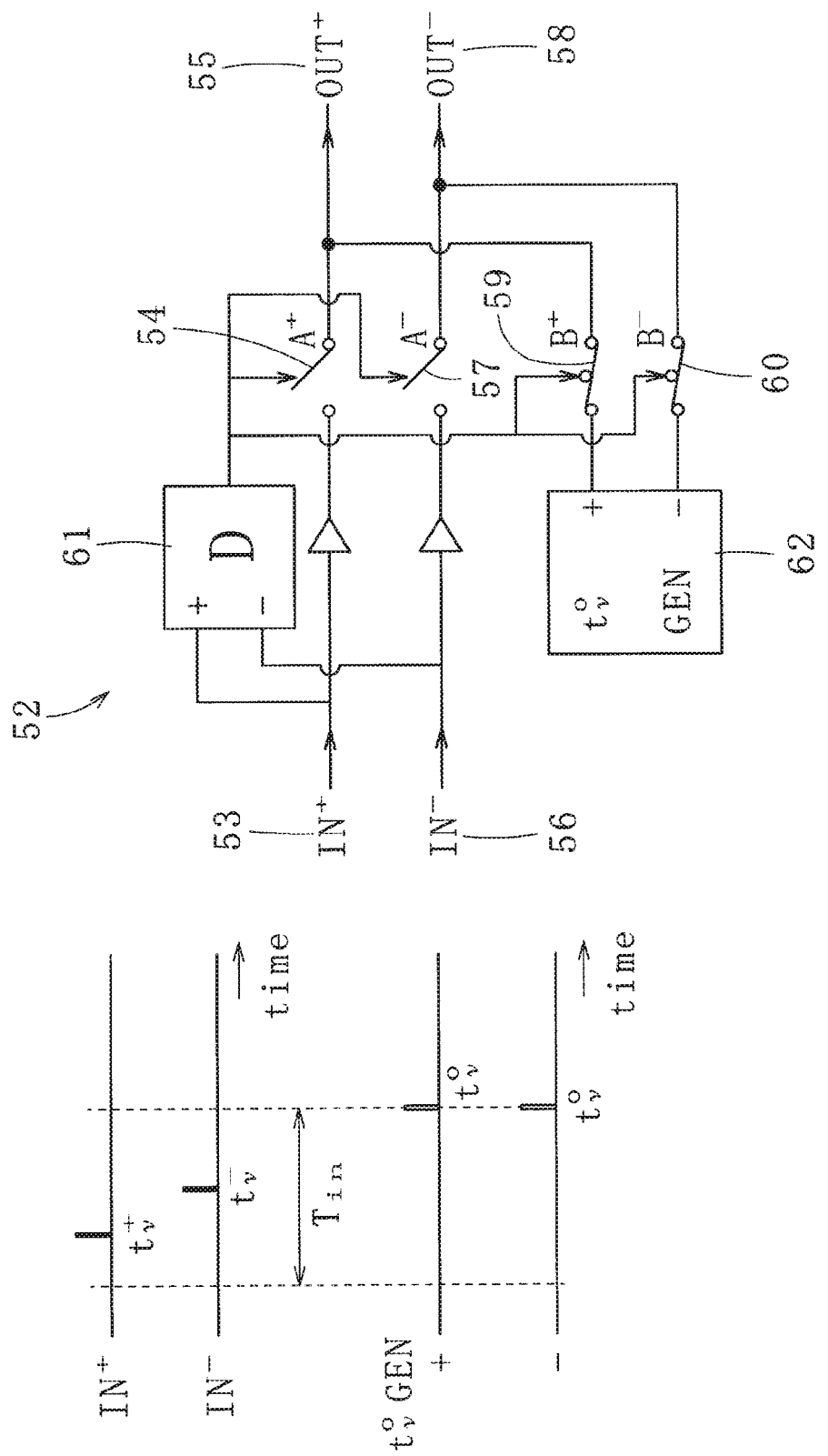
FIG. 9 An explanatory diagram showing a ReLU function circuit.

Each of the ReLU function circuits 52 may include a circuit in FIG. 9, for example. Each of the ReLU function circuits 52 includes an input terminal 53 corresponding to the first capture-and-storage means 19, a switch 54, an output terminal 55 that is connected to the input terminal 53 via a delay circuit producing constant delay time and the switch 54, an input terminal 56 and a switch 57 corresponding to the second capture-and-storage means 27, and an output terminal 58 that is connected to the input terminal 56 via the delay circuit producing the constant delay time and the switch 57.

Each of switches 59 and 60 is connected to each of the output terminals 55 and 58 respectively, and a control part 61 that controls on/off of each of the switches 54, 57, 59, and 60 is connected to each of the switches 54, 57, 59, and 60. Moreover, a signal-transmission part 62 that transmits the electric signal corresponding to the value 0 to each of the output terminals 55 and 58 when each of the switches 59 and 60 is on is connected to each of the switches 59 and 60.

In the case that the first timing is the same as the second timing, or, in the case that the first timing is earlier than the second timing, the control part 61 turns each of the switches 54 and 57 to on and each of the switches 59 and 60 to off, and makes each of the output terminals 55 and 58 output the calculated-object value.

In the case that the first timing is later than the second timing, the control part 61 turns each of the switches 54 and 57 to off and each of the switches 59 and 60 to on, and makes each of the output terminals 55 and 58 output the electric signal indicating the value 0.

Moreover, a reason that the dummy load is adopted is to make each of the sum of the positive loads and the sum of the negative loads equal to each other. In a case of the neural network having the plurality of layers in FIG. 8, each of the inputs from the lowest layer to the upper layer is a single signal line. However, each of the connections between the further upper layers necessarily needs a pair of signal lines corresponding to the positive load and the negative load. By providing the signal line for the positive load and the signal line for the negative load respectively, a condition that each of the sum of the positive loads and the sum of the negative loads is made to be equal to each other is automatically satisfied, and as a result, the dummy load is unnecessary.

Figure 11:
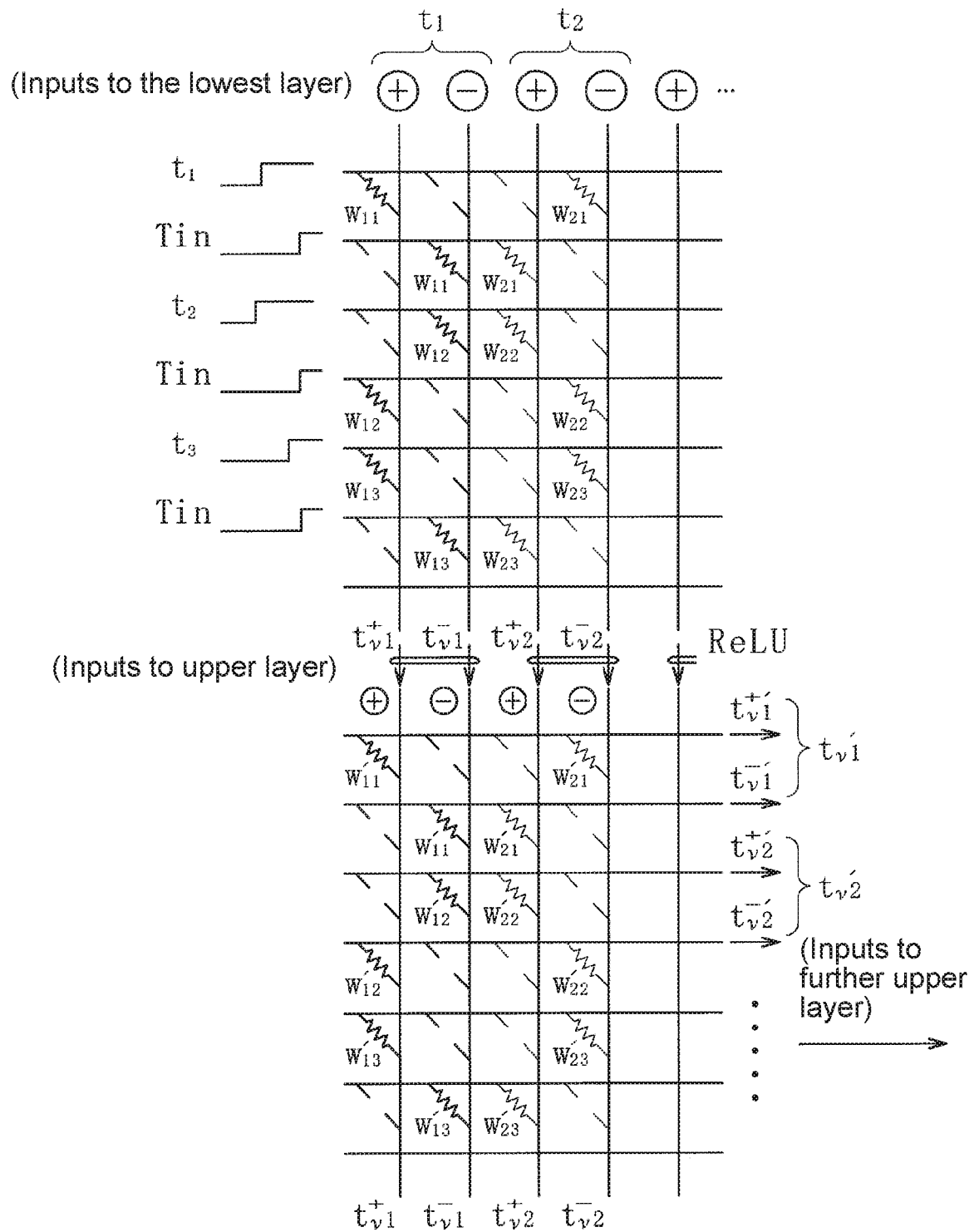
FIG. 11 An explanatory diagram showing a circuit in a case that a dummy load is unnecessary.

Furthermore, similarly, by changing the signal line from the lowest layer with a pair of signal lines, the dummy load is unnecessary. As shown in FIG. 11, thus, when a plurality of pairs of an input line and an output line in which a resistance (or MOS transistor) as a load intervenes are provided, and a resistance value corresponding to the load $w_i$ is connected to the input line or the output line in each of the pairs, the dummy load may not be provided. Note that, in FIG. 11, each of the diodes for preventing countercurrent is not shown for simplification. As expressed by the equation 1, an input signal line is structured by making a pair of the timing $t_i$ corresponding to the input value $x_i$ and the timing $T_{in}$ corresponding to the input value 0 in each of the inputs to the lowest layer.

Figure 12:
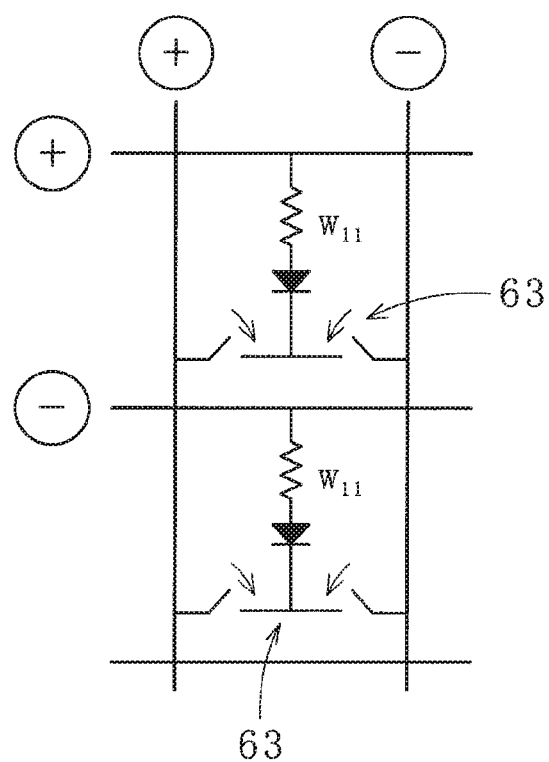
FIG. 12 An explanatory diagram showing a circuit in a case that each of resistances is switched by each of change-over switches.

As shown in FIG. 12, by a structure in which each of the resistances (or MOS transistors) is switched by each of change-over switches 63, each of the positive loads or the negative loads is also easily switched. The multiply-accumulate operation device 10 according to the first embodiment has only the structure in which the multiply-accumulate operation is executed. However, a case in which a learning function is performed outside, and after that, a load value is updated, the load value is updated from the positive load to the negative load, or the load value is updated from the negative load to the positive load is also produced. According to the example in FIG. 12, the case may be realized only by switching each of the change-over switches 63, and as a result, mounting may be easily performed. Note that in a case that a timing is transmitted by a network having a plurality of layers, as expressed by the equation 24, the result by the multiply-accumulate operation is obtained by multiplying a coefficient $\beta_o/T_{in}$ by the timing, and it is possible that the load value is not allowed to diverge by normalizing a load set to the next upper layer by a multiplicative inverse of the coefficient.

Moreover, in the embodiment described above, it is efficient that a nonvolatile memory device such as a resistance random-access memory device or a ferroelectric-gate-type MOS transistor is applied to the resistance or the MOS transistor used as each of the load values, or each of the change-over switches in order that each of the resistance values and each of the thresholds are variable.

Experimental Example

Next, a numerical-simulation experiment performed to confirm the effect of the present invention will be described. In the present simulation, it is confirmed whether the calculated-object values in a case that the dummy load is adopted in a multiply-accumulate operation device to which 500 input parts giving electric signals to analog circuits and signal output terminals giving bias values are connected and in a case that the dummy load is not adopted in the multiply-accumulate operation device to which the 500 input parts giving the electric signals to the analog circuits and the signal output terminals giving the bias values are connected are equal to each other.

Figure 10:
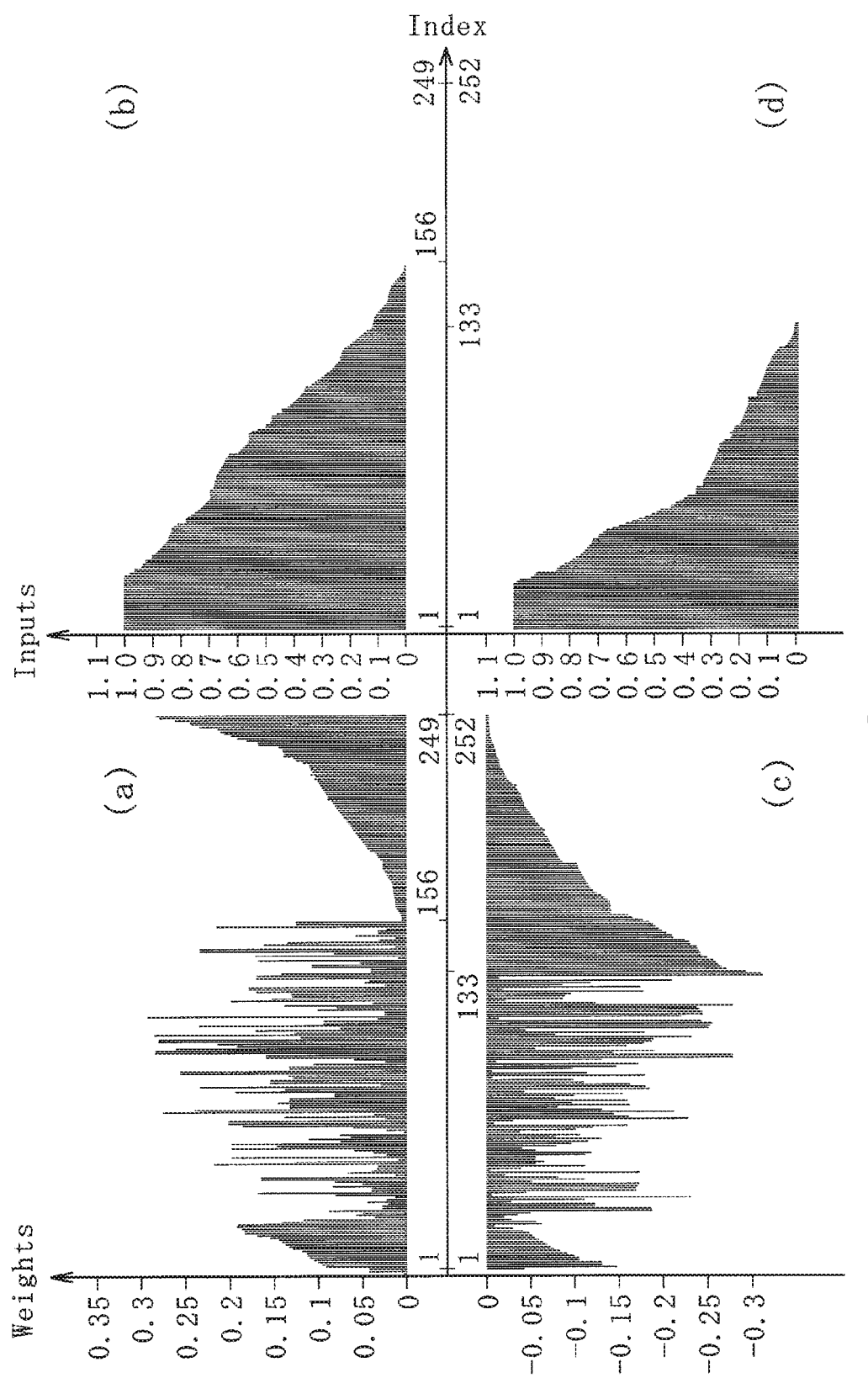
FIG. 10 Explanatory diagrams showing each of loads and each of electric signals applied to a simulation.

Each of positive loads, each of values of electric signals corresponding to the positive loads, each of negative loads, and each of values of electric signals corresponding to the negative loads are shown in FIGS. 10 (a), (b), (c), and (d) respectively. Note that a load corresponding to a bias voltage and a value of the bias voltage are included and shown in FIGS. 10 (c) and (d) respectively.

According to the result of the simulation, both in the case that the dummy load is adopted and in the case that the dummy load is not adopted, the calculated-object value is 4.718, and it is confirmed that the calculated-object values are equal to each other.

As described above, the embodiments of the present invention are described. However, the present invention is not limited only to the embodiments, and a change of a condition or the like may be made without departing from the gist of the present invention in the applicable range of the present invention.

For example, the dummy load may not necessarily be adopted to obtain the calculated-object value. In the case that the dummy load is not adopted, a circuit obtaining the calculated-object value on the basis of the equation 20 may be provided.

Moreover, the processing by the activation function is not necessarily needed.

INDUSTRIAL APPLICABILITY

A multiply-accumulate operation device according to the present invention may improve an operation capacity of a neural network, and as a result, it is expected that the multiply-accumulate operation device according to the present invention is applied and developed to an IoT sensing edge terminal and the like.

REFERENCE SIGNS LIST 10 multiply-accumulate operation device
11, 11a analog circuit
12 input part
13 output means
14 capture-and-storage means
15 input terminal
16 resistance
17 diode
18 first output means
19 first capture-and-storage means
20 input terminal
21 PMOS transistor
22 diode
23 voltage-output terminal
24 signal-transmission part
26 second output means
27 second capture-and-storage means
28 input terminal
29 PMOS transistor
30 diode
31 voltage-output terminal
32 signal-transmission part
33 arithmetic part
34 multiply-accumulate deriving means
35 circuit unit
36 capacitor
38 AND gate
39 electric-current supply terminal
40 switch
41 capacitor
42 first output means
43 variable resistance 44 first output means
50 multiply-accumulate operation device
51 signal output terminal
52 ReLU function circuit
53 input terminal
54 switch
55 output terminal
56 input terminal
57 switch
58 output terminal
59, 60 switch
61 control part
62 signal-transmission part
63 change-over switch

The invention claimed is:

1. A multiply-accumulate operation device performs a series of processing by using an analog circuit, the series of processing including causing each of N electric signals being given to correspond to each of loads, multiplying each of values of the electric signals by each of values of the loads corresponding to the electric signals to obtain N multiplied values, and deriving a sum of the N multiplied values, the analog circuit including $N^+$ first output means that cause each of $N^+$ electric signals being given in a predetermined period T1 to correspond to each of positive loads and output electric charges respectively, each of the electric charges having a size depending on each of values of the electric signals and each of values of the positive loads corresponding to the electric signals, a first capture-and-storage means to which the $N^+$ first output means are connected in parallel and in which the electric charges output from each of the N first output means are stored, $(N-N^+)$ second output means that cause each of $(N-N^+)$ electric signals being given in the period T1 to correspond to each of absolute values of negative loads and output electric charges respectively, each of the electric charges having a size depending on each of values of the electric signals and each of the absolute values of the negative loads corresponding to the electric signals, a second capture-and-storage means to which the $(N-N^+)$ second output means are connected in parallel and in which the electric charges output from each of the $(N-N^+)$ second output means are stored, and a multiply-accumulate deriving means calculating a first multiply-accumulate value when detecting that a voltage held in the first capture-and-storage means reaches a preset first threshold, calculating a second multiply-accumulate value when detecting that a voltage held in the second capture-and-storage means reaches a preset second threshold, and obtaining the sum of the N multiplied values by subtracting the second multiply-accumulate value from the first multiply-accumulate value, the first multiply-accumulate value being a sum of $N^+$ multiplied values obtained by multiplying each of the positive loads corresponding to the $N^+$ electric signals by each of the values of the $N^+$ electric signals respectively, the second multiply-accumulate value being a sum of $(N-N^+)$ multiplied values obtained by multiplying each of the absolute values of the negative loads corresponding to the $(N-N^+)$ electric signals by each of the values of the $(N-N^+)$ electric signals respectively, characterized in that the first threshold has a size proportional to a product of a sum of the $N^+$ positive loads and a length of the period T1, the second threshold has a size proportional to a product of a sum of the absolute values of the $(N-N^+)$ negative loads and the length of the period T1, and the multiply-accumulate operation device derives the first multiply-accumulate value and the second multiply-accumulate value in a period T2 having the same length as the length of the period T1 after the period T1, wherein the N is a natural number that is two or more, and the $N^+$ is a natural number that is the N or less.

2. The multiply-accumulate operation device according to claim 1, characterized in that the multiply-accumulate operation device adds a dummy load to a smaller one of the sum of the $N^+$ positive loads or the sum of the absolute values of the $(N-N^+)$ negative loads, the dummy load corresponding to a virtual electric signal having a value 0, and being a number obtained by multiplying −1 by a difference of the sum of the $N^+$ positive loads and the sum of the absolute values of the $(N-N^+)$ negative loads, makes the sum of the $N^+$ positive loads be equal to the sum of the absolute values of the $(N-N^+)$ negative loads, and obtains the sum of the N multiplied values on a basis of a difference of a first timing at which the voltage held in the first capture-and-storage means reaches the first threshold and a second timing at which the voltage held in the second capture-and-storage means reaches the second threshold.

3. The multiply-accumulate operation device according to claim 2, characterized in that a plurality of the analog circuits are hierarchically connected via switch mechanisms, each of the switch mechanisms transmits the sum of the N multiplied values that each of the analog circuits in a lower layer obtains to each of the analog circuits in an upper layer in a case that the first timing is the same as the second timing, or, in a case that the first timing is earlier than the second timing, and each of the switch mechanisms transmits the value 0 to each of the analog circuits in the upper layer in a case that the first timing is later than the second timing.

* * * * *